United States Patent [19]
Dietrich et al.

[11] Patent Number: 4,782,099
[45] Date of Patent: Nov. 1, 1988

[54] PROCESS FOR THE PRODUCTION OF ELASTIC, OPEN-CELLED FLEXIBLE POLYURETHANE FOAMS HAVING INCREASED COMPRESSION HARDNESS

[75] Inventors: Manfred Dietrich, Leverkusen; Hans-Walter Illger, Roesrath-Forsbach, both of Fed. Rep. of Germany; Peter Vogtel, Tarragona, Spain

[73] Assignee: Bayer Aktiengesellschaft, Leverkusen, Fed. Rep. of Germany

[21] Appl. No.: 88,441

[22] Filed: Aug. 21, 1987

[30] Foreign Application Priority Data

Sep. 5, 1986 [DE] Fed. Rep. of Germany ....... 3630225

[51] Int. Cl.$^4$ .............................................. C08G 18/14
[52] U.S. Cl. ...................................... 521/175; 521/914
[58] Field of Search ............................... 521/175, 914

[56] References Cited

U.S. PATENT DOCUMENTS

| | | | |
|---|---|---|---|
| 3,433,751 | 3/1969 | Kobe et al. | 260/2.5 |
| 3,931,066 | 1/1976 | Puig et al. | 521/175 |
| 4,211,849 | 7/1980 | Kollmeier et al. | 521/164 |

FOREIGN PATENT DOCUMENTS

| | | |
|---|---|---|
| 0132302 | 1/1985 | European Pat. Off. . |
| 3323872 | 1/1985 | Fed. Rep. of Germany . |
| 1396105 | 6/1975 | United Kingdom . |
| 1415560 | 11/1975 | United Kingdom . |

*Primary Examiner*—Maurice J. Welsh
*Attorney, Agent, or Firm*—Gene Harsh, Joseph C. Gil, Richard E.L. Henderson

[57] ABSTRACT

Flexible polyurethane foams having increased compression hardness are produced by reacting an organic polyisocyanate with a mixture of polyols in the presence of a blowing agent and optionally known additives such as catalysts, emulsifiers, etc. The mixture of polyols is (1) 75-95 wt % polyether polyol with terminal OH groups having a functionality of from 2 to 4 and an OH number of from 25 to 60 and (2) 5-25 wt % polyether polyol having a functionality of at least six and an OH number of from 150 to 200 which is the reaction product of an alcohol having a functionality of at least six and propylene oxide which has been modified to contain 5-50 wt % terminal ethylene oxide groups. These foams are useful in furniture applications.

12 Claims, No Drawings

PROCESS FOR THE PRODUCTION OF ELASTIC, OPEN-CELLED FLEXIBLE POLYURETHANE FOAMS HAVING INCREASED COMPRESSION HARDNESS

BACKGROUND OF THE INVENTION

The present invention relates to a process for the production of flexible polyurethane foams and the foams produced by that process.

Flexible polyurethane foams may be produced from known flexible foam polyethers. Generally, bi- to trifunctional polyethers in which the polyether chains are made up of ethylene oxide and propylene oxide or of propylene oxide alone and which have propylene oxide and, hence, secondary OH groups are reacted in known manner with TDI-80 (tolylene diisocyanate containing 80% 2,4- and 20% 2,6-isomer).

The hardness of these foams is largely determined by their gross density (foam density). Hardness can only be increased for the same foam density by increasing the TDI index (stoichiometric amount, of TDI to that of the other reaction components with a stoichiometric reaction being 100). Narrow limits are however imposed by such a process.

Since increased foam hardness is a desirable property, attempts to achieve that property by selection of appropriate reactants have been made. Foams of increased hardness are generally produced by one of two methods. In the first of these known methods, active polyethers, i.e. polyethers which contain ethylene oxide residues at the end of the chain and which therefore contain a high proportion of primary OH groups, are used. In the foaming of these active polyethers, TDI-65 (tolylene diisocyanate containing 65% 2,4- and 25% 2,6-isomer) must be used in addition to TDI-80 to avoid the formation of closed cells and shrinkage. However, the stability during foaming (i.e. susceptibility to the disturbances typically affecting foam production) of these systems is basically inferior to systems based on standard ethers and TDI-80.

In the second method, mixtures of standard ethers with filled polyols (polyethers containing an organic filler in finely dispersed phase) are used. In this process, foaming with TDI-80 is possible. This process is also comparable in terms of foaming stability to the processes in which standard polyols are used. However, this second alternative has economic disadvantages with respect to the mixing component used in comparison with the foaming of standard ethers and, generally, in comparison with the processing of active systems using TDI-65.

Not one of the processes aimed at obviating the described disadvantages by using short-chain, polyfunctional crosslinking agents in admixture with standard polyethers to increase compression hardness (including those which afford economic advantages) has acquired any significance for one or more of the following reasons:

(1) The addition of monomeric OH-functional compounds such as glycerol, trimethylolpropane and triethanolamine, even in small quantities (less than 2 percent by weight), leads to shrinkage. Consequently no property improvements can be obtained.

(2) The addition of alkoxylated polyamines or polyfunctional alcohols, possible in quantities of up to 5 percent by weight, significantly impairs the open-cell character, tensile strength and breaking elongation without appreciably increasing compression hardness.

(3) The addition of alkoxylated polyhydric alcohols having OH numbers of up to 120 does lead to open-cell foams, but the increase in hardness is minimal and the tensile strength and, above all, breaking elongation of the resulting foams are adversely affected due to the large quantities which have to be added.

(4) The addition of crystalline, polyhydric alcohols such as sorbitol, finely dispersed in the polyether (disclosed in DE-OS No. 2,507,161) requires melting of the polyfuactional alcohol component during the foaming process to achieve the described effect of increasing compression hardness.

As described in GB-PS No. 1,396,105, propoxylation products of polyhydric alcohols, such as trimethylolpropane and pentaerythritol, having OH numbers around 175 may be co-foamed in 9 parts without any problems. However, no increase in compression hardness is obtained.

According to GB-PS No. 1,396,105 and DE-OS No. 3,323,872, foams combining increased compression hardness with other favorable mechanical properties are obtained by using adducts of alkylene oxides (ethylene oxide and/or propylene oxide) and monomeric, polyfunctional alcohols having a functionality of $\geq 6$ and OH numbers of from 120 to 200 which are compatible with standard polyethers in admixture with standard polyethers. The disclosed alkylene oxide adduct may be used in quantities of up to 20 wt. % using standard flexible-foam formulations, preferably formulations based on TDI-80.

SUMMARY OF THE INVENTION

It has now been found that polyfunctional alcohols having a functionality of $\geq 6$ terminally modified in particular with ethylene oxide may be used in quantities of up to 25 wt % in admixture with standard polyethers to produce foams having considerably higher compression hardness values than the foams described in the literature. These mixtures of a modified polyfunctional alcohol and known polyethers are reacted with a polyisocyanate, preferably TDI-65 and other known additives to produce these foams.

DETAILED DESCRIPTION OF THE INVENTION

The present invention relates to a process for the production of elastic, open-cell flexible polyurethane foams having considerably increased compression hardness by reaction of (a) a polyisocyanate with (b) a polyol mixture in the presence of (c) water and/or organic blowing agents, optionally using (d) catalysts, stabilizers and other auxiliaries and additives known to those skilled in the art.

The polyol mixture (b) used is a mixture of (1) from 95 to 75 wt % of a polyether polyol with terminal OH groups having a functionality of from 2 to 4 and an OH number of from 25 to 60 and (2) from 5 to 25 wt % of an at least hexafunctional polyether polyol having an OH number of from 150 to 200 which has been modified by reaction of an alcohol which is at least hexafunctional with a propylene oxide terminally modified with from 5 to 50 wt %, preferably with from 10 to 30 wt % (based on total alkylene oxide) of ethylene oxide.

This invention also relates to the foams produced by this process.

In the present invention, aromatic polyisocyanates are preferably used as the polyisocyanates. Tolylene diisocyanate containing 65 wt % of 2,4-isomer and 35 wt % of 2,6-isomer is most preferred.

Preferred polyethers having a functionality of at least 6 are those which have been obtained by reaction of sorbitol with propylene oxide and then with ethylene oxide.

Polyether polyols containing a filler or secondary OH groups having a functionality of from 2 to 4 and an OH number of from 25 to 60 are preferably used as polyether polyol (1).

Polyisocyanates useful in the present invention include aliphatic, cycloaliphatic, araliphatic, aromatic and heterocyclic polyisocyanates, of the type described for example by W. Siefken in Justus Liebigs Annalen der Chemie, 562, pages 75 to 136, for exmaple those corresponding to the formula

$Q(NCO)_n$ in which
n=2-4, preferably 2, and
Q represents an aliphatic hydrocarbon radical containing from 2 to 18 (preferably from 6 to 10) C-atoms, a cycloaliphatic hydrocarbon radical containing from 4 to 15 (preferably from 5 to 10) C-atoms, an aromatic hydrocarbon radical containing from 6 to 15 (preferably from 6 to 13) C-atoms or an araliphatic hydrocarbon radical containing from 8 to 15 (preferably from 8 to 13) C-atoms.

Specific examples of such polyisocyanates include: 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (DE-AS No. 1, 202,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -1,4-phenylene diisocyanate, 2,4- and 2,6-tolylene diisocyanate and mixtures of these isomers, diphenylmethane-2,4'- and/or -4,4'-diisocyanate and naphthylene-1,5-diisocyanate.

Other suitable polyisocyanates include: triphenylmethane-4,4',4"-triisocyanate; polyphenylpolymethylene polyisocyanates of the type obtained by phosgenation of aniline-formaldehyde condensates (described, for example, in GB-PS Nos. 874,430 and 848,671); m- and p-isocyanatophenyl sulfonyl isocyanates (U.S. Pat. No. 3,454,606); perchlorinated aryl polyisocyanates of the type described, for example, in DE-AS No. 1,157,601 (U.S. Pat. No. 3,277,138); polyisocyanates containing carbodiimide groups of the type described in DE-PS No. 1,092,007 (U.S. Pat. No. 3,152,162) and in DE-OS No. 2,504,400, 2,537,685 and 2,552,350; norbornane diisocyanates (U.S. Pat. No. 3,492,330); polyisocyanates containing allophanate groups of the type described, for example, in GB-PS No. 994,890, in BE-PS No. 761,626 and in Netherlands published patent application 7,102,524; polyisocyanates containing isocyanurate groups of the type described, for example, in U.S. Pat. No. 3,001,973, in DE-PS No. 1,022,789, 1,222,067 and 1,027,394 and in DE-OS No. 1,929,034 and 2,004,048; polyisocyanates containing urethane groups of the type described, for example, in BE-PS No. 752,261 and in U.S. Pat. No. 3,394,164 and 3,644,457: polyisocyanates containing acylated urea groups (DE-PS No. 1,230,778); polyisocyanates containing biuret groups of the type described, for example, in U.S. Pat. No. 3,124,605, 3,201,372 and 3,124,605 and in GB-PS No. 889,050: polyisocyanates produced by telomerization reactions of the type described, for example, in U.S. Pat. No. 3,654,106; polyisocyanates containing ester groups of the type described, for example, in GB-PS No. 965,474 and 1,072,956, in U.S. Pat. No. 3,567,763 and in DE-PS No. 1,231,688; reaction products of the above-mentioned isocyanates with acetals (DE-PS No. 1,072,385); and polyisocyanates containing polymeric fatty acid esters (U.S. Pat. No. 3,455,883).

It is also possible to use the isocyanate-group-containing distillation residues obtained in the industrial manufacture of isocyanates, optionally in solution in one or more of the above-mentioned polyisocyanates. Mixtures of the above-mentioned polyisocyanates may also be used. Aromatic polyisocyanates are preferred.

Particularly preferred polyisocyanates are, in general, the polyisocyanates readily obtainable on an industrial scale, for example 2,4- and 2,6-tolylene diisocyanate and mixtures of these isomers ("TDI"), polyphenyl polymethylene polyisocyanates of the type obtained by phosgenation of aniline-formaldehyde condensates ("crude MDI") and polyisocyanates containing carbodiimide groups, urethane groups, allophanate groups, isocyanurate groups, urea groups or biuret groups ("modified polyisocyanates"), more especially modified polyisocyanates of the type derived from 2,4-and/or 2,6-tolylene diisocyanate and from 4,4'- and/or 2,4'-diphenylmethane diisocyanate. Tolylene diisocyanate containing 65 wt % of 2,4- and 35 wt % of 2,6-isomer (TDI-65) is especially preferred.

The polyol component used in accordance with the present invention is a polyether-polyol mixture of which 95 to 75 wt % is a polyether polyol having a functionality of from 2 to 4 and an OH number of from 25 to 60. These polyethers which contain from 2 to 4 and Preferably from 2 to 3 hydroxyl groups are known and may be obtained, for example, by polymerization of epoxides, such as ethylene oxide, propylene oxide (preferred), butylene oxide, tetrahydrofuran, styrene oxide or epichlorohydrin on their own, for example in the presence of Lewis catalysts (such as $BF_3$). These epoxides, (preferably propylene oxide), may also be added optionally in admixture or successively, to small quantities of starter components containing reactive hydrogen atoms, such as water, alcohols, ammonia or amines. Examples of appropriate starter components include ethylene glycol, 1,3- or 1,2-propylene glycol, trimethylolpropane, glycerol, 4,4'-dihydroxydiphenyl propane, aniline, ethanolamine or ethylenediamine. Trimethylolpropane and/or glycerol are preferably used as starter components.

Preferred polyethers are those which exclusively or very largely contain secondary OH groups (more than 90 wt %, based on all the OH groups present in the polyether). These polyethers include the so-called standard flexible-foam polyethers.

Polyethers which contain fillers such as those disclosed in DE-OS Nos.2,423,984: 2,513,815; 2,519,004: 2,550,796: 2,550,797; 2,255,860; 2,639,254; and DE-PS Nos. 1,168,075 and 1,260,142 are also preferred.

The other component of the polyol mixture which is present in a quantity of from 5 to 25 wt % is an at least hexafunctional polyether polyol having an OH number of from 150 to 200. This polyether polyol is an adduct of a polyfunctional alcohol containing 6 or more OH groups, preferably 6 to 8 OH groups, such as sorbitol (preferred) or sucrose and propylene oxide which has been terminally modified with from 5 to 50 wt % (preferably with from 10 to 30 wt %) of ethylene oxide (based on total alkylene oxide). Alkoxylation products of sorbitol having an OH number of approximately 175 are preferred.

Water and/or readily volatile inorganic or organic compounds may be used as blowing agents. Suitable organic blowing agents include: acetone; ethylacetate: halogen-substituted alkanes such as methylene chloride, chloroform, ethylidene chloride, vinylidene chloride, monofluorotrichloromethane, chlorodifluoromethane, dichlorofluoromethane; and butane, hexane, heptane or diethyl ether. Suitable inorganic blowing agents are, for example, air, $CO_2$ and $N_2O$. A blowing effect may also be obtained by addition of compounds which decompose at temperatures above room temperature with evolution of gases, for example nitrogen, such as azo compounds (e.g., azodicarbonamide and azoisobutyronitrile).

Further examples of blowing agents and information on the use of blowing agents can be found in Kunststoff-Handbuch, Vol. VII, edited by Vieweg and Hochtlen, Carl-Hanser-Verlag, Munich 1966, for example on pages 108 and 109, 453 to 455 and 507 to 510.

Catalysts, stabilizers and other known additives may be optionally used in the practice of the Present invention. Known catalysts include tertiary amines such as triethylamine, tributylamine, N-methyl morpholine, N-ethyl morpholine, N,N,N',N'-tetramethyl ethylene diamine, pentamethyl diethylenetriamine and higher homologs (DE-OS Nos. 2,624,527 and 2,624,528), 1,4-diazabicyclo-(2,2,2)-octane, N-methyl-N'-dimethylaminoethyl piperazine, bis-(dimethyl-aminoalkyl)-piperazines (DE-OS No. 2,636,787), N,N'-dimethylbenzylamine, N,N-dimethyl cyclohexylamine, N,N-diethyl benzylamine, bis-(N,N-diethylaminoethyl)-adipate, N,N,N',N'-tetramethyl-1,3-butanediamine, N,N-dimethylphenyl ethylamine, 1,2-dimethyl imidazole, 2-methyl imidazole, monocyclic and bicyclic amidines (DE-OS No. 1,720,633), bis-(dialkylamino)-alkyl ethers (U.S. Pat. No. 3,330,782, DE-AS No. 1,030,558 and DE-OS Nos. 1,804,361 and 2,618,280) and tertiary amines containing amide groups, preferably formamide groups (DE-OS Nos. 2,523,633 and 2,732,292). Other suitable catalysts are known Mannich bases of secondary amines such as dimethyl amine, aldehydes (preferably formaldehyde), ketones such as acetone, methyl ethyl ketone or cyclohexanone, and phenols such as phenol, nonylphenol or bisphenol.

Tertiary amines containing isocyanate-reactive hydrogen atoms suitable for use as catalysts include: triethanolamine, triisopropanolamine, N-methyl diethanolamine, N-ethyl diethanolamine, N,N-dimethyl ethanolamine, reaction products thereof with alkylene oxides, such as propylene oxide and/or ethylene oxide and also secondary-tertiary amines (DE-OS No. 2,732,292).

Other suitable catalysts are sila-amines containing carbon-silicon bonds of the type described for example in DE-PS No. 1,229,290 (corresponding to U.S. Pat. No. 3,620,984), such as 2,2,4-trimethyl-2-silaorpholine and 1,3-diethylaminoethyl tetramethyl disiloxane.

Nitrogen-containing bases such as tetra-alkyl ammonium hydroxides, alkali hydroxides such as sodium hydroxide, alkali phenolates such as sodium phenolate, and alkali alcoholates, such as sodium methylate are also suitable catalysts. Hexahydrotriazines may also be used as catalysts (DE-OS No. 1,769,043).

The reaction between NCO groups and Zerewitinoff-active hydrogen atoms is also greatly accelerated by lactams and azalactams, in which case a complex is initially formed between the lactam and the compound containing acidic hydrogen. Complexes such as these and their catalytic effect are described in DE-OS Nos. 206,288, 2,062,289, 2,117,576 (U.S. Pat. No. 3,758,444), 2,129,198, 2,330,175 and 2,330,211.

In the present invention, organometallic compounds, particularly organotin compounds, may also be used as catalysts. In addition to sulfur-containing compounds, such as di-n-octyltin mercaptide (DE-AS No. 1,769,367; U.S. Pat. No. 3,645,927), preferred compounds are tin-(II) salts of carboxylic acids such as tin(II) octoate, tin(II) ethyl hexoate and tin(II) laurate, and tin(IV) compounds such as dibutyltin oxide, dibutyltin dichloride, dibutyltin diacetate, dibutyltin dilaurate, dibutyltin maleate and dioctyltin diacetate.

All of the above-mentioned catalysts may of course also be used in the form of mixtures. Of particular interest in this respect are combinations of organometallic compounds and amidines, aminopyridines or hydrazinopyridines (DE-OS Nos. 2,434,185, 2,601,082 and 2,603,834).

Other representatives of catalysts which may be used in accordance with the invention and information on their mode of action can be found in Kunststoff-Handbuch, Vol. VII, edited by Vieweg and Hochtlen, Carl-Hanser-Verlag, Munich 1966, for example on pages 96 to 102.

If used, the catalyst is generally employed in a quantity of from about 0.001 to 10 wt %, based on the total quantity of polyethers containing at least two hydroxyl groups.

Emulsifiers useful in the practice of the present invention include the sodium salts of castor oil sulfonates and salts of fatty acids with amines such as diethyl amine oleate and diethanolamine stearate. Alkali or ammonium salts of sulfonic acids such as dodecyl benzene sulfonic acid and dinahthyl methane disulfonic acid, or of fatty acids such as ricinoleic acid, or of polymeric fatty acids may also be used as surface-active additives.

Suitable foam stabilizers include polyether siloxanes, particularly the water-soluble types. The structure of these compounds is generally such that a copolymer of ethylene oxide and propylene oxide is attached to a polydimethyl siloxane residue. Foam stabilizers such as these are described, for example, in U.S. Pat Nos. 2,834,748, 2,917,480 and 3,629,308. Polysiloxanepolyoxyalkylene copolymers branched through allophanate groups according to DE-OS No. 2,558,523 are often of particular interest.

Reaction retarders, for example acids such as hydrochloric acid or organic acid halides may optionally be used. Cell regulators known to those in the art such as paraffins or fatty alcohols or dimethyl polysiloxanes; pigments or dyes; known flameproofing agents such as trischloroethyl phosphate, tricresyl phosphate, ammonium phosphate and polyphosphate; stabilizers against the effects of aging and weather; plasticizers; fungistatic and bacteriostatic substances; and fillers such as barium sulfate, kieselguhr, carbon black or whiting may also be used.

Further examples of surface-active additives, foam stabilizers, cell regulators, reaction retarders, flameproofing agents, plasticizers, dyes, fillers, fungistatic and bacteriostatic agents which may optionally be used in accordance with the invention and information on how such additives are used and on their modes of action can be found in Kunststoff-Handbuch, Vol. VII, edited by Vieweg and Hochtlen, Carl-Hanser-Verlag, Munich 1966, for example on pages 103 to 113.

In the process of the present invention, the reaction components may be reacted by the known one-shot process, the prepolymer process or the semiprepolymer process. Apparatus such as those described in U.S. Pat. No. 2,764,565 are often used. The reaction is generally carried out at NCO indices of from 95 to 120. Information on processing machines which may be used in accordance with the invention can also be found in Kunststoff-Handbuch, Carl-Hanser-Verlag, Munich 1966, for example on pages 121 to 205.

Foams may of course also be produced by block foaming or by the known laminator process.

The foams produced by the process of the present invention are useful as mattresses and upholstery materials.

The process according to the invention is illustrated by the following Examples.

EXAMPLES

Table 1 briefly summarizes the characteristics of the crosslinking agents used.

Table 2 containing Examples 1 to 6 demonstrates the significant increase in compression hardness obtained where the polyol mixture according to the invention is used. Comparison Examples 7-15 show that:
(1) a reduction of the primary OH group content in the short-chain polyethers used leads to a reduction in compression hardness (Comparison Examples 9-12),
(2) a reduction in the functionality of the starter for otherwise the same primary OH group content also results in a reduction in compression hardness (Comparison Examples 13-15), and
(3) a reduction in the OH number (Comparison Example 7) reduces compression hardness while an increase in the OH number (Comparison Example 8), although increasing compression hardness, leads to other unacceptable mechanical properties.

Table 3 shows that an increase in the quantity of crosslinking agent used in the polyol mixture leads to an increase in compression hardness, although the other foam properties, such as tensile strength and breaking elongation (and also the elasticity values which are not shown in the Table) assume unacceptable values.

Table 4 shows the increase of the compression hardness of foams obtained according to the process of the invention (examples 20 and 22) in comparison to a usual high load bearing foam (example 19) and a usual high resilient foam (example 21).

TABLE 1

| Product No. | Starting Alcohol | % by wt. Terminal Ethylene oxide* | Percentage Content of primary OH groups | OH Number | % by wt. Ethylene Oxide in Mixed Block |
|---|---|---|---|---|---|
| 1 | sorbitol | 5 | 20 | 175 | — |
| 2 | sorbitol | 10 | 31 | " | — |
| 3 | sorbitol | 15 | 40 | " | — |
| 4 | sorbitol | 20 | 45 | " | — |
| 5 | sorbitol | 30 | 56 | " | — |
| 6 | sorbitol | 50 | 68 | " | — |
| 7 | sorbitol | 20 | 56 | 125 | — |
| 8 | sorbitol | 20 | 43 | 250 | — |
| 9 | sorbitol | — | 4 | 175 | 10 |
| 10 | sorbitol | — | 8 | " | 30 |
| 11 | sorbitol | — | 25 | " | 50 |
| 12 | sorbitol | 0 | <3 | " | — |
| 13 | trimethylol propane | 10 | 33 | " | — |
| 14 | trimethylol propane | 20 | 45 | " | — |
| 15 | trimethylol propane | 30 | 56 | " | — |

*based on total epoxide

TABLE 2

| Example | \multicolumn{15}{c}{FOAMING EXAMPLES} | Units |

| Example | 1 | 2 | 3 | 4 | 5 | 6 | 7 | 8 | 9 | 10 | 11 | 12 | 13 | 14 | 15 | Units |
|---|---|---|---|---|---|---|---|---|---|---|---|---|---|---|---|---|
| Commercial polyether polyol (three functional), OH number 45, containing sec. OH groups (Desmophen 7135, Bayer AG) | 85 | 85 | 85 | | | | | | | | | | | | | |
| Commercial polyether polyol, OH number 45 containing sec. OH groups (Desmophen 7135, Bayer AG) | | | | 85 | 85 | 85 | 85 | 85 | 85 | 85 | 85 | 85 | 85 | 85 | 85 | Parts by weight |
| Crosslinking Agent* | 15 | 15 | 15 | 15 | 15 | 15 | 15 | 15 | 15 | 15 | 15 | 15 | 15 | 15 | 15 | Parts by weight |
| Water | 4.6 | 4.6 | 4.6 | 4.6 | 4.6 | 4.6 | 4.6 | 4.6 | 4.6 | 4.6 | 4.6 | 4.6 | 4.6 | 4.6 | 4.6 | Parts by weight |
| Commercial flexible-foam stabilizer (polyalkylene glycol-polysiloxane block copolymer) | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 | Parts by weight |
| TDI (tolylene diisocyanate, 65:35 mixture of 2,4- and 2,6-diisocyanatotoluene) | 62.7 | 62.7 | 62.7 | 62.7 | 62.7 | 62.7 | 61.4 | 64.6 | 62.7 | 62.7 | 62.7 | 62.7 | 62.7 | 62.7 | 62.7 | Parts by weight |
| NCO index | 112 | 112 | 112 | 112 | 112 | 112 | 112 | 112 | 112 | 112 | 112 | 112 | 112 | 112 | 112 | |
| Commercial amine activator (Desmorapid PS 207, Bayer AG) | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | Parts by weight |
| Tin(II) octoate | 0.35 | 0.35 | 0.35 | 0.35 | 0.24 | 0.24 | 0.32 | 0.18 | 0.30 | 0.27 | 0.25 | 0.20 | 0.4 | 0.32 | 0.3 | Parts by weight |

TABLE 2-continued

FOAMING EXAMPLES

| Example | 1 | 2 | 3 | 4 | 5 | 6 | 7 | 8 | 9 | 10 | 11 | 12 | 13 | 14 | 15 | Units |
|---|---|---|---|---|---|---|---|---|---|---|---|---|---|---|---|---|
| Gross Density | 23 | 22 | 23 | 23 | 23 | 23 | 23 | 23 | 23 | 22 | 23 | 23 | 23 | 23 | 23 | kg/m$^{-3}$ |
| Tensile strength | 140 | 110 | 110 | 110 | 90 | 100 | 90 | 130 | 90 | 90 | 85 | 80 | 110 | 90 | 90 | kPa |
| Breaking elongation | 70 | 70 | 70 | 60 | 70 | 75 | 70 | 40 | 70 | 75 | 70 | 70 | 85 | 65 | 70 | % |
| Compression hardness | 6.0 | 6.2 | 6.5 | 6.9 | 6.6 | 6.9 | 5.7 | 7.3 | 5.5 | 5.6 | 5.9 | 5.3 | 5.7 | 5.6 | 5.6 | kPa |
| Compression set at 90% compression | 30 | 20 | 15 | 30 | 30 | 45 | 13 | 60 | 60 | 50 | 40 | 50 | 13 | 19 | 11 | % |

*The Crosslinking Agent used is that composition from Table 1 having the same number as the Example number in this Table 2.

TABLE 3

DIFFERENT MIXING RATIOS STANDARD POLYETHER/CROSSLINKING AGENT

| Example | 16 | 17 | 18 | Units |
|---|---|---|---|---|
| Commercial polyether polyol (three functional), OH number 45, containing sec. OH groups (Desmophen 7135, Bayer AG) | 91 | 85 | 80 | Parts by Weight |
| Product 3 of Table 1 | 9 | 15 | 20 | Parts by Weight |
| Water | 2.5 | 2.5 | 2.5 | Parts by Weight |
| Commercial flexible-foam stabilizer (polyalkylene glycol-polysiloxane block copolymer) | 0.4 | 0.4 | 0.4 | Parts by Weight |
| TDI (tolylene diisocyanate, 65:35 mixture of 2,4- and 2,6-diisocyanatotoluene) | 37.2 | 39.2 | 40.3 | Parts by Weight |
| NCO index | 112 | 112 | 112 | |
| Commercial amine activator (Desmorapid PS 207, Bayer AG) | 0.12 | 0.12 | 0.12 | Parts by Weight |
| Commercial amine activator (dimethyl ethanolamine) | 0.2 | 0.2 | 0.2 | Parts by Weight |
| Tin(II) octoate | 0.20 | 0.25 | 0.25 | |
| Gross density | 42 | 42 | 42 | kg/m$^{-3}$ |
| Tensile strength | 160 | 180 | 125 | kPa |
| Breaking elongation | 155 | 145 | 60 | % |
| Compression hardness | 8.0 | 8.8 | 9.6 | kPa |

TABLE 4

FOAMS PRODUCED WITH FILLER CONTAINING POLYOL WITH PRIMARY OH GROUPS

| Example | 19 (Comparative) | 20 | 21 (Comparative) | 22 | Units |
|---|---|---|---|---|---|
| Commercially available polyol (functionality nearly three) with primary OH groups having an OH number of 32 (Desmophen 7652, Bayer AG) | 100 | 90 | 100 | 90 | Parts by weight |
| Product 4 from Table 1 | — | 10 | — | 10 | Parts by weight |
| Water | 2.75 | 2.75 | 2.75 | 2.75 | Parts by weight |
| Commercial Stabilizer for flexible foam (polyalkylene glycol-polysiloxane block copolymer) | 0.8 | 0.8 | — | — | Parts by weight |
| Commercial HR Stabilizer (polysiloxane oil) (KS 53 Bayer) | — | — | 0.15 | 0.15 | Parts by weight |
| TDI 80 | 18.3 | 19.5 | 40.6 | 42.1 | Parts by weight |
| TDI 65 | 18.3 | 19.5 | — | — | Parts by weight |
| NCO-Index | 105 | 105 | 105 | 105 | Parts by weight |
| Amine Activator PS207 (Bayer AG) | 0.15 | 0.15 | — | — | Parts by weight |
| Amine Activator Dimethylethanolamine | 0.15 | 0.15 | — | — | Parts by weight |
| Amine Activator Dabco 33LV | — | — | 0.12 | 0.12 | Parts by weight |
| Diethanolamine | — | — | 1.3 | 1.0 | Parts by weight |
| Tin(II) Octoate | 0.15 | 0.14 | 0.1 | 0.1 | Parts by weight |
| Density | 38 | 38 | 33 | 33 | kg/m$^3$ |
| Compression Hardness | 6.5 | 7.7 | 4.0 | 5.5 | kPa |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of elastic open-celled flexible polyurethane foams having substantially increased compression hardness in which
   (a) a polyisocyanate is reacted with
   (b) a polyol mixture of
      (1) 75-95 wt % polyether polyol with terminal OH groups having a functionality of from 2 to 4 and an OH number of from 25 to 60 and
      (2) 5-25 wt % of a polyether polyol having a functionality of at least six and an OH number of from 150 to 200 which is the reaction product of an alcohol having a functionality of at least six and propylene oxide that has been modified to contain 5-50 wt % terminal ethylene oxide groups based on total alkylene oxide
   in the presence of
   (c) a blowing agent and, optionally
   (d) a known catalyst, stabilizer and/or other known additive.

2. The process of claim 1 in which polyether polyol (b)(1) is a filler containing polyether polyol.

3. The process of claim 1 in which polyether polyol (b)(1) is a polyether polyol containing secondary OH groups.

4. The process of claim 1 in which polyether polyol (b)(2) has been modified to contain 10-30 wt % terminal ethylene oxide groups.

5. The process of claim 1 in which polyisocyanate (a) is an aromatic polyisocyanate.

6. The process of claim 1 in which polyisocyanate (a) is tolylene diisocyanate containing 65 wt % 2,4-isomer and 35 wt % 2,6-isomer.

7. The process of claim 1 in which the alcohol having a functionality of at least six used to produce polyether polyol (b)(2) is sorbitol.

8. The polyurethane foam produced by the process of claim 1.

9. The polyurethane foam produced by the process of claim 2.

10. The polyurethane foam produced by the process of claim 3.

11. The polyurethane foam produced by the process of claim 6.

12. The polyurethane foam produced by the process of claim 7.

* * * * *